United States Patent
Smith (10) Patent No.: US 9,715,895 B1
(45) Date of Patent: Jul. 25, 2017

(54) MULTI-BRUSH INTERFACE FOR POWER RAIL COMMUNICATIONS

(71) Applicant: ORACLE INTERNATIONAL CORPORATION, Redwood City, CA (US)

(72) Inventor: Frank Smith, Nederland, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 15/056,766

(22) Filed: Feb. 29, 2016

(51) Int. Cl.
| | |
|---|---|
| *G06F 7/00* | (2006.01) |
| *G06F 19/00* | (2011.01) |
| *G11B 15/68* | (2006.01) |
| *B60L 5/38* | (2006.01) |
| *G11B 33/12* | (2006.01) |

(52) U.S. Cl.
CPC .............. *G11B 15/689* (2013.01); *B60L 5/38* (2013.01); *G11B 15/682* (2013.01); *G11B 33/126* (2013.01)

(58) Field of Classification Search
None
See application file for complete search history.

(56) References Cited

U.S. PATENT DOCUMENTS

| | | | |
|---|---|---|---|
| 6,840,360 B1* | 1/2005 | Ostwald .................. | B65G 1/00 191/2 |
| 6,885,911 B1* | 4/2005 | Smith .................. | G11B 17/225 104/88.02 |
| 7,184,238 B1* | 2/2007 | Ostwald ................. | G11B 15/68 340/664 |
| 2003/0002202 A1* | 1/2003 | Smith ................ | G05B 19/4068 360/92.1 |
| 2003/0002204 A1* | 1/2003 | Ostwald ............ | G05B 19/4068 360/92.1 |
| 2003/0004609 A1* | 1/2003 | Canaday .............. | G11B 17/225 700/245 |

* cited by examiner

*Primary Examiner* — Yolanda Cumbess
(74) *Attorney, Agent, or Firm* — Marsh Fischmann & Breyfogle LLP; Daniel J. Sherwinter (57) ABSTRACT

Embodiments include systems and methods for distribution of power and communications to robotic assemblies in data storage libraries, including enabling instruction signal communications during robot motion on conductive rails of the data storage library. For example, each robot can include at least two distinct sets of brushes, one set (e.g., pair) of power brushes and one set of signal brushes. The power brushes can be optimized for transferring power from the rails to the robot, and the signal brushes can be optimized for communicating instruction signals from the rails to the robot during robot motion. The power brushes can be coupled with power processing circuitry, and the signal brushes can be coupled with signal processing circuitry. Certain embodiments isolate the power and signal circuitry to improve power and/or signal distribution properties. Such techniques can appreciably increase the cartridge exchange rate and/or otherwise improve performance of the data storage library.

20 Claims, 5 Drawing Sheets

MULTI-BRUSH INTERFACE FOR POWER RAIL COMMUNICATIONS

FIELD

Embodiments relate generally to large data storage libraries, and, more particularly, to techniques for handling power and communications for robotic assemblies in data storage libraries.

BACKGROUND

Many data storage environments include large libraries in which data is stored on large numbers of media and accessed using robots and other electromagnetic components. For example, a large media storage library may have thousands of data media (e.g., data tapes) arranged in slots of magazines, and multiple media drives (e.g., tape drives) and/or other components for reading data from, and writing data to, the data media. When a library user logically accesses data stored on a data medium, a robot can be instructed to ride along rails and/or other support structure to physically visit the location (i.e., the magazine slot) of the invoked data medium, a mechanical hand of the robot can pick the data medium from its magazine slot, the robot can deliver the data medium to (and load the data medium in) a media drive, and the media drive can perform read and/or write operations as instructed by the user.

Performing operations involving the robotic assemblies can involve powering the robotic components and communicating instructions with those components. However, distribution of power and communications can be difficult, particularly in environments where the rails and/or other support structures can be long, where two or more robotic assemblies can share a rail, etc. In some conventional libraries, the movement of the robotic assemblies can be restricted by wire cable connections, or the like, used for providing power and/or communications. For example, cabling can limit the types and/or extents of movement available to the robotic assemblies. To avoid such cabling issues, certain robotic libraries have incorporated brush/wiper technology for distribution of power. For example, the rails can include fixed conductive strips, and the robotic assemblies can include brushes or wipers that contact the conductive strips. Power can be conducted from the conductive strips to the robotic assembly components through the brushes or wipers.

In few instances, such techniques have been used to provide communications to the robotic assemblies by modulating the power signal according to a data signal. However, because of brush/wiper limitations, such communications are typically limited. For example, while the robot is moving, the signal-to-noise ratio of communications received through brushes or wipers is typically so low as to render the communications effectively unusable; so that communications are typically restricted only to times when the robot is not moving.

BRIEF SUMMARY

Among other things, embodiments provide novel systems and methods for distribution of power and communications to robotic assemblies in data storage libraries, including enabling instruction signal communications during robot motion on conductive rails of the data storage library. For example, each robot can include at least two distinct sets of brushes, one set (e.g., pair) of power brushes and one set of signal brushes. The power brushes can be optimized for communicating power from the rails to the robot, and the signal brushes can be optimized for communicating instruction signals from the rails to the robot during robot motion. The power brushes can be coupled with power processing circuitry, and the signal brushes can be coupled with signal processing circuitry. Certain embodiments isolate the power and signal circuitry to improve power and/or signal distribution properties. Such techniques can appreciably increase the cartridge exchange rate and/or otherwise improve performance of the data storage library.

According to one set of embodiments, a robot system is provided for ferrying media cartridges in a data storage library. The robot system includes: a robot controller subsystem that directs movement of the robot system along a conductive rail structure; a set of signal brushes adapted to maintain electrical signal contact between the robot system and the conductive rail structure; a set of power brushes adapted to maintain electrical power contact between the robot system and the conductive rail structure; a signal processing circuit having a set of signal brush inputs coupled with the set of signal brushes, and an instruction signal output coupled with the robot controller subsystem; and a power processing circuit having a set of power brush inputs coupled with the set of power brushes, and a power signal output coupled with the robot controller subsystem, such that the robot controller subsystem is powered according to the power signal output and directs movement of the robot system along the conductive rail structure according to the instruction signal output.

According to another set of embodiments, a data storage library system is provided. The data storage library system includes a conductive rail structure, a robot, and a robot-rail interface structure. The robot is adapted to ferry media cartridges and includes: a signal processing circuit having a set of signal brush inputs and an instruction signal output; and a power processing circuit having a set of power brush inputs and a power signal output. The robot-rail interface structure is adapted to mechanically couple the robot to the conductive rail structure and includes: a set of signal brushes electrically coupled with the set of signal brush inputs and adapted to maintain electrical signal contact with the conductive rail structure; and a set of power brushes electrically coupled with the set of power brush inputs and adapted to maintain electrical power contact with the conductive rail structure.

According to another set of embodiments, a method is provided for communicating with a robot via conductive rails in a data storage library. The method includes: receiving a power signal by a power processing circuit of the robot, the power signal received from the conductive rails through a set of power brushes that electrically couple the robot with the conductive rails; receiving an instruction signal by a signal processing circuit of the robot, the instruction signal received from the conductive rails through a set of signal brushes that electrically couple the robot with the conductive rails; powering the robot according to the received power signal; and directing movement of the powered robot along the conductive rails according to the received instruction signal.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
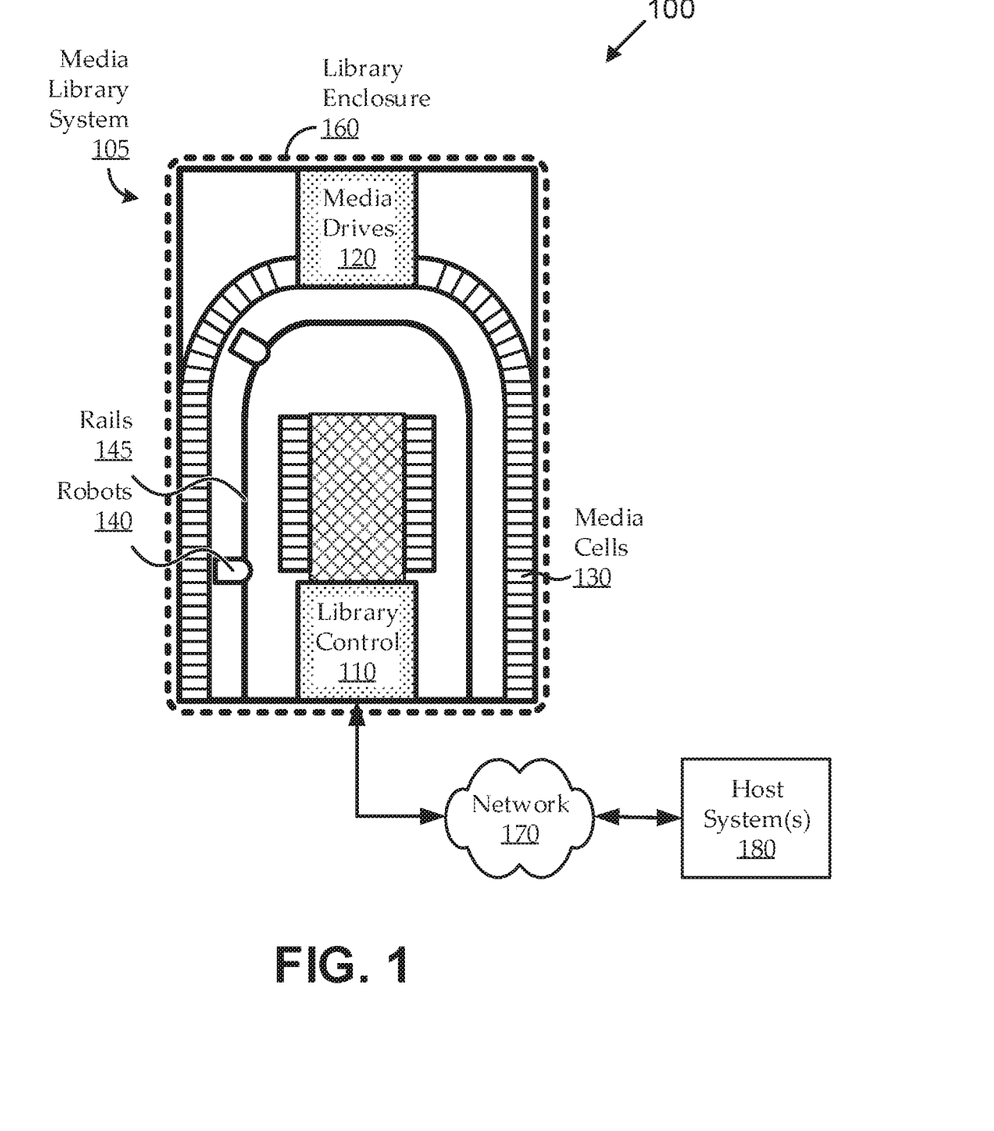
FIG. 1 shows an illustrative media library environment as context for various embodiments.

Turning first to FIG. 1, an illustrative media library environment 100 is shown as context for various embodiments. The media library system 105 can include arrays of multiple media cells 130 housing storage media. For example, the media library system 105 can be a tape (and/or any other suitable media) storage library having thousands of tape cartridges (or any other suitable storage media) in slots of magazines (i.e., media cells). One or more robots 140 can be used to ferry the storage media between the media slots 130 and one or more media drives 120 (e.g., tape drives) used to perform read/write operations on the storage media. The media library system 105 can include one or more library controller subsystems 110 for controlling library user interfaces, robot 140 operations, media drive 120 operations, maintenance and diagnostics functions, etc. The library controller subsystems 110 can be implemented with any suitable hardware and/or software components.

Various media library system 105 operations, such as operations involving the robot(s) 140, can involve sending power and/or instructions to the robot(s) 140 and/or other components via communications links (e.g., as alternating current (AC) signals over cables, direct current (DC) rails or busses, etc.). For example, operation of the robot(s) 140 in the media library system 105 can involve maintaining power to the robot(s) 140 as they move throughout the media library system 105, and communicating instructions to (and receiving feedback from) the robot(s) 140 as they perform pick and place operations involving the storage media. Such power and communications can be distributed to components of the media library system 105 using various techniques.

In some media libraries 100, the robots 140 travel along rails 145 (along with other support structure), for example, between the media slots 130 and the media drives 120. Distribution of power and communications to the robots 140 can be difficult, particularly where the rails 145 and/or other support structures can be long, where two or more robots 140 can share a rail 145, etc. In some conventional libraries, the movement of the robotic assemblies can be restricted by wire cable connections, or the like, used for providing power and/or communications. For example, cabling can limit the types and/or extents of movement available to the robotic assemblies.

To avoid such cabling issues, certain robotic libraries have incorporated brush/wiper technology for distribution of power. For example, the robot(s) 140 can travel over a given route that has, integrated therein, a power distributor, such as fixed conductive strips (e.g., a 48-volt DC rail 145), to supply power to the robot(s) 140. The robot(s) 140 can include brushes or wipers that contact the conductive strips to conduct power to the robot(s) 140 via the rails 145. Such techniques can permit greater freedom of movement for the robot(s) 140, increased modularity and/or expandability (e.g., for modular and extensible power distribution as library configurations change), etc. For the sake of illustration, some conventional media libraries use a four-brush system on each robot 140. In such libraries, each robot 140 includes two redundant pairs of conductive brushes for transferring power from the rails 145 to the robot 140.

Some conventional storage libraries use the same conductive strips (e.g., the oppositely charged conductive layers of a power strip) for communicating instruction signals between the library controller subsystems 110 and the robot(s) 140 via the same conductive brushes. For example, a 48-volt DC power signal can be modulated by an AC signal in accordance with a digital instruction signal (e.g., a one to three-volt AC signal modulated by frequency shift keying, or in any other suitable manner). The instruction signal can be used to direct operation of the robot(s) 140, to receive feedback from the robot(s) 140, etc. When the modulated power signal is received by the robot(s) 140 via the rails 145 and the conductive brushes, a power circuit can be used to effectively separate the instruction signal from the power signal. The power signal and the instructions signal can then be used separately by robotic components, as appropriate.

Reliable distribution of power and/or instructions signals can depend on good electrical contact between the robot(s) 140 and the rails 145 via the brushes. For example, conventional brush-based approaches in storage libraries typically use redundant pairs of copper brushes to maintain electrical contact with the rails 145. For example, the brushes can each be made of an alloy that is approximately 75 percent copper, 24 percent graphite, and a number of other materials. Such a composition can provide a good balance between conductivity, operational life, and cost. For example, relative to aluminum, copper is typically more conductive and more expensive; relative to silver, copper is typically less conductive and less expensive. Also, the alloy can be designed to manifest a desired hardness. For example, softer brushes tend to maintain better electrical contact, but have shorter operational life (i.e., they wear more quickly); while harder brushes tend to have less reliable electrical contact, but have longer operational life. Various characteristics of the alloy can further be designed for other purposes, such as to avoid excessive heating during robot 140 operations (e.g., while the robot 140 moves, it may draw appreciable amounts of current from the rails 145 and may tend to heat the brushes). In some implementations, a primary pair of copper brushes is used to contact the positive and negative sides of the rail 145, respectively. A redundant pair of copper brushes can also be included (i.e., also in contact with the positive and negative sides of the rail 145, respectively) in case the primary pair fails. Over time, such failures have tended to be relatively uncommon.

While a robot 140 is stationary (i.e., not moving on the rails 145), the copper brushes can provide good electrical contact for distribution of power and instruction signals. However, when the robot 140 is in motion on the rails 145, the resistance of the electrical coupling via the brush (the brush resistance) can dramatically increase, and the brush conductivity can decrease. This can appreciably decrease the signal-to-noise ratio to a level where the instruction signal level can be similar to the noise level on the rails 145. In such instances, the instruction signal can effectively be unusable, for example, as effectively indistinguishable from noise. Because the signal characteristics can be so poor during robot 140 movement, designers and users of such conventional storage libraries in the industry have settled on restricting instruction communications with the robot 140 to times when the robot 140 is stationary on the rails 145.

Designing conventional brush-based storage libraries to allow robot 140 communications only when the robot is stationary can limit the cartridge exchange rate. For example, suppose first and second robots 140 both travel along a same set of rails 145. The first robot 140 is instructed to pick a designated media cartridge from a media cell 130 (e.g., a magazine slot), and to ferry the media cartridge to a desired media drive 120 (e.g., tape drive). Once the first robot 140 begins its trip from the media cell 130 to the media drive 120, communications may be restricted over the rails 145, and there may be no way to initiate a task involving the second robot 140. The second robot 140 may have to wait to perform cartridge operations, even though the first robot 140 is not physically in its way. This can effectively limit the rate at which cartridge exchange operations (and/or other types of operations involving the robots 140) can be carried out.

For example, as illustrated, the storage library system 105 can be in communication with one or more host systems 180. The communications can be via one or more networks 170, and the network(s) 170 can include any suitable type of communications links (e.g., public or private, wired or wireless, local or remote, etc.). The host system(s) 180 can be used to perform file-based and/or block-based functions (e.g., data access, data write, backup, etc.), maintenance and/or diagnostic functions, etc. These and other functions can involve directing the robot(s) 140 to move around the storage library system 105, ferrying cartridges between media cells 130 and media drives 120, auditing library locations (e.g., using the robot(s) 140 to determine whether there are empty cartridge or drive slots, etc.), etc. As described above, efficiency of movement of the robot(s) 140 (e.g., speed, rate, etc.) in performance of these and/or other functions can be limited by restrictions on the timing and/or reliability of communications with robot(s) 140.

Embodiments described herein can permit instruction signal communications (to and from the robot 140) during robot 140 motion on the rails 145. In some embodiments, each robot 140 includes at least two distinct pairs of brushes: one pair of power brushes, and one pair of signal brushes. The power brushes can be optimized for transferring power from the rails 145 to the robot 140, and the signal brushes can be optimized for communicating instruction signals from the rails 145 to the robot 140 during robot 140 motion. In some embodiments, the power brushes can be coupled with power processing circuitry to deliver power to robot 140 components, and the signal brushes can be coupled with signal processing circuitry to deliver instructions to robot 140 components. Certain embodiments can isolate the power and signal circuitry to improve power and/or signal distribution properties. Such an approach can appreciably increase the cartridge exchange rate and/or otherwise improve performance of the data storage library.

Figure 2:
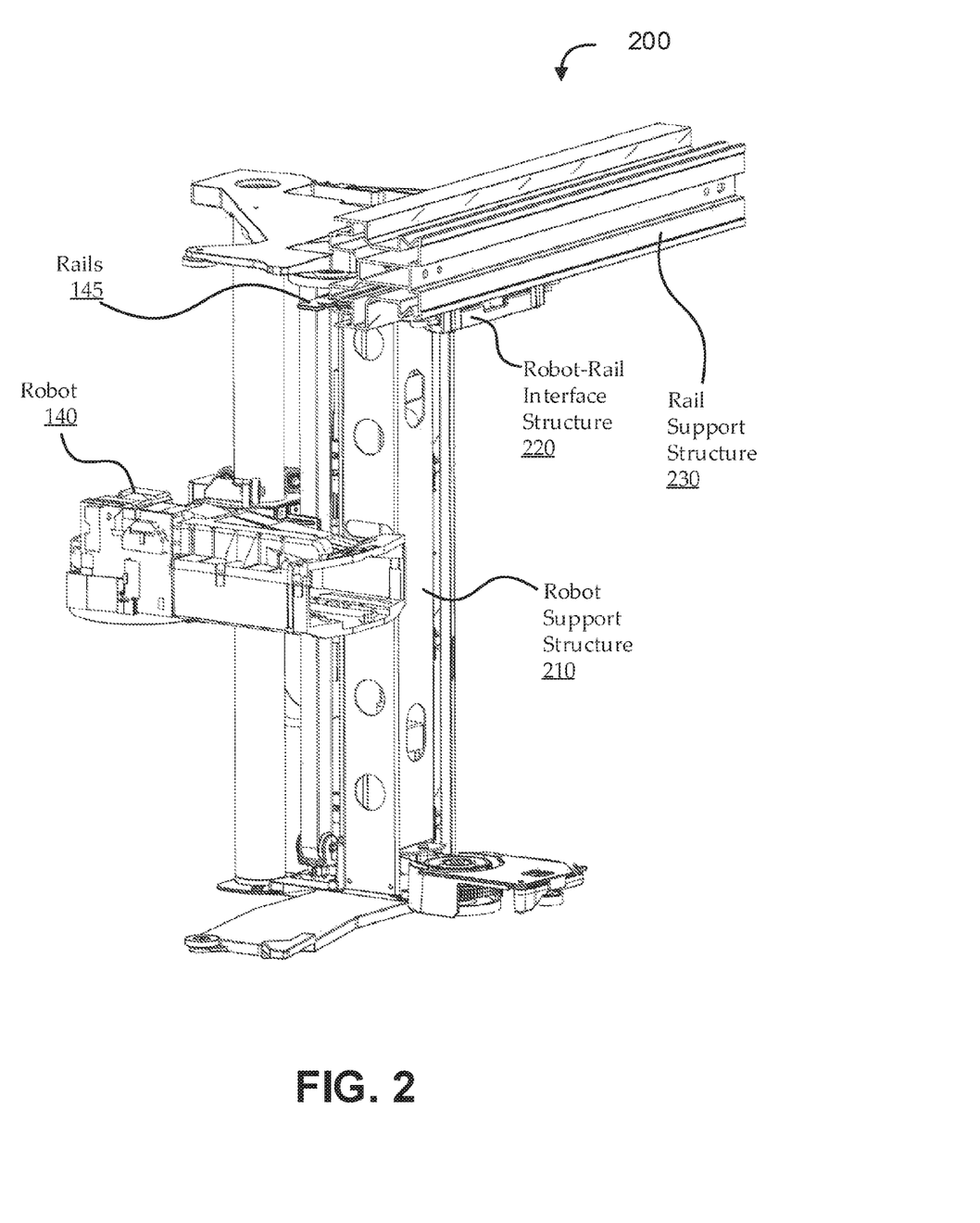
FIG. 2 shows an isometric view of a portion of a storage library system, such as the one described in FIG. 1, according to various embodiments.

FIG. 2 shows an isometric view 200 of a portion of a storage library system, such as the one described in FIG. 1, according to various embodiments. As described above, the library can include one or more robots 140 that can move along one or more rails 145. The rails 145 can be supported by rail support structure 230, which can effectively provide a track that defines certain types of robot 140 movement throughout the library. The robot(s) 140 can be supported by various types of robot support structure 210, which can include electromechanical and/or other components to enable and support movement of the robot in multiple directions (e.g., in a direction of the rails 145, in one or more directions orthogonal to the rail direction, etc.).

As illustrated, the robot support structure 210 can couple with the rail support structure 230 via robot-rail interface structure 220. As used herein, references to movement of the "robot" can broadly include combined movement of some or all of the robot 140, the robot support structure 210, and the robot-rail interface structure 220. The robot-rail interface structure 220 can provide both a structural interface and an electrical interface for the robot 140. For example, the robot-rail interface structure 220 can structurally couple the robot support structure 210 with the rail support structure 230 in a manner that permits secure and stable movement of the robot 140 to desired locations in the storage library. The robot-rail interface structure 220 can also support an electrical coupling between the robot 140 and the conductive rails 145 via brushes, as described herein. The electrical coupling can enable both power transfer and signal communications.

Figure 3:
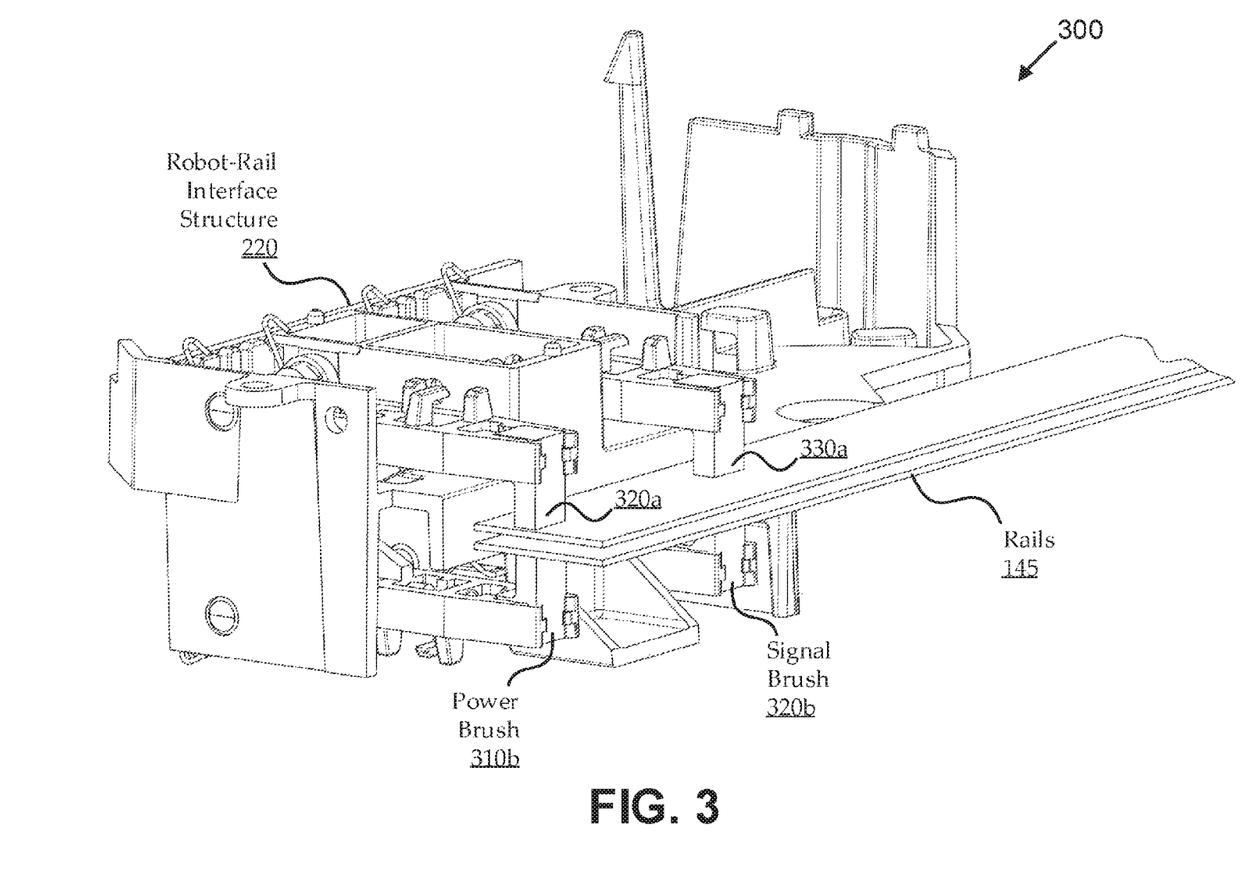
FIG. 3 shows an isometric view of an illustrative robot-rail interface structure, according to one embodiment.

FIG. 3 shows an isometric view 300 of an illustrative robot-rail interface structure 220, according to one embodiment. As illustrated, the robot-rail interface structure 220 includes a pair of power brushes 310, and a pair of signal brushes 320. The brushes are in electrical contact with conductive rails 145. The rails 145 can include a "signal path" and a "return path," which can be implemented in any suitable manner. Each pair of brushes includes a first brush (e.g., power brush 310a and signal brush 320a) in electrical contact with the signal path of the rails 145, and a second brush (e.g., power brush 310b and signal brush 320b) in electrical contact with the return path of the rails 145.

In the illustrated implementations, the signal path and the return path are implemented as separate rails 145 (e.g., a signal rail and a return rail). For example, the rails 145 can be implemented to provide a 48-volt DC voltage between the rails 145, which can be received as a power signal by the robot (not shown) via the power brushes 310. An instruction signal can be modulated and/or otherwise communicated over the rails 145, and can be received by the robot via the signal brushes 320. For example, the instruction signal can be implemented as a small-signal (e.g., 1-3 volts) AC signal modulated onto the DC power signal (e.g., by frequency shift keying, or in any other suitable manner).

As described above, the conventional copper brushes can be suitable for receiving power via the conductive rails 145. However, such copper brushes tend to be incapable of reliably receiving the instruction signal via the rails 145, particularly while the robot is in motion. Accordingly, in some embodiments, the power brushes 310 are implemented as copper brushes, and the signal brushes 320 are implemented as silver brushes. The silver signal brushes 320 can provide sufficient conductivity and other properties for reliable instruction signal communications, even while the robot is moving. In some implementations, each power brush 310 can be made primarily of copper (e.g., 75 percent copper, as described above) to provide sufficient conductivity for the power signal along with desired other properties (e.g., appropriate hardness, cost, thermal conductivity, etc.), and each signal brush 320 can be made primarily of silver (e.g., approximately 75 percent silver, 24 percent graphite, and additional materials to manifest desired other properties).

Figure 4:
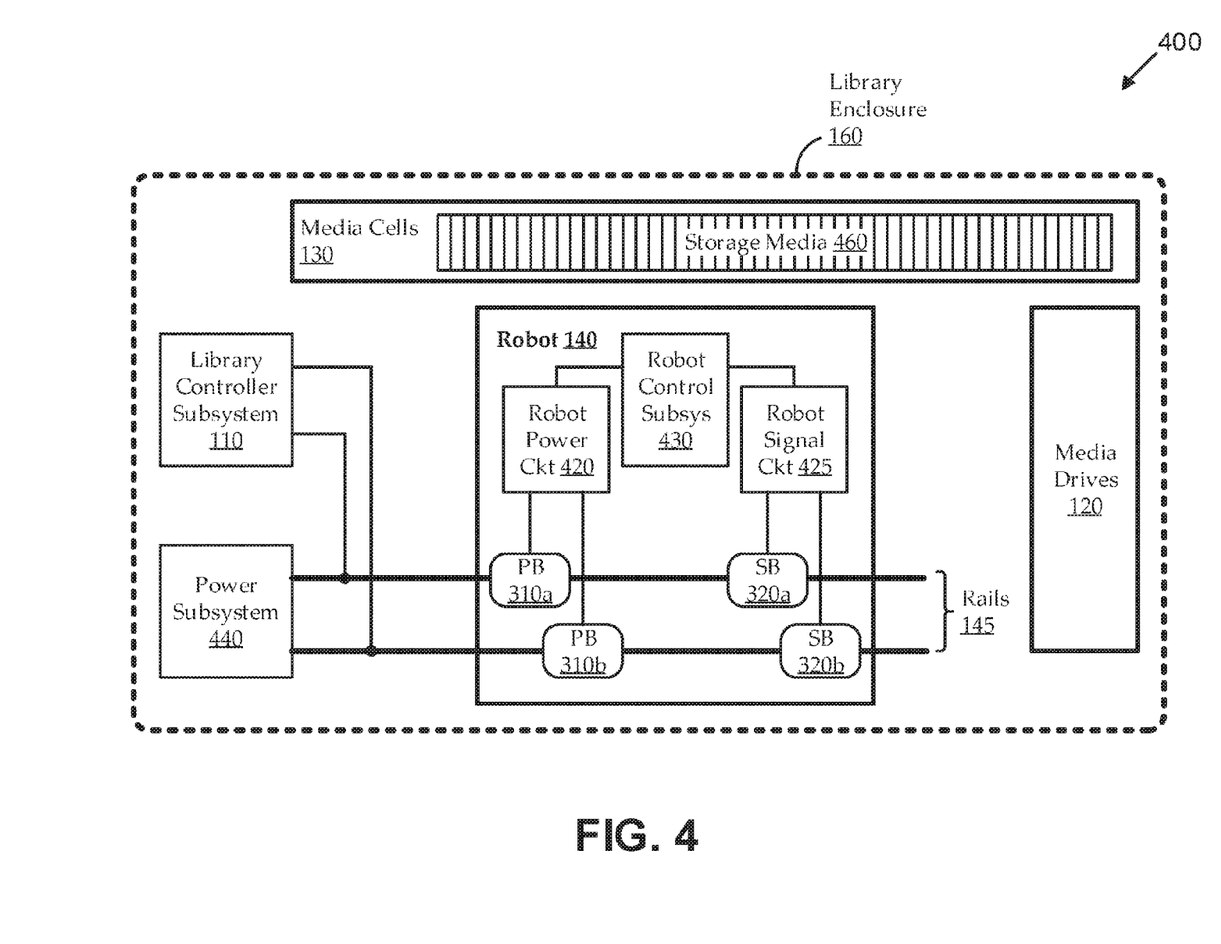
FIG. 4 shows a block diagram of an illustrative media library, according to various embodiments.

FIG. 4 shows a block diagram of an illustrative media library 400, according to various embodiments. The media library 400 can include arrays of multiple media cells 130 (e.g., magazine slots) housing storage media 460 (e.g., thousands of tape cartridges), one or more robot controller subsystems 430 (controlling one or more robots 140) to ferry the storage media between the media cells 130 and one or more media drives 120, and one or more library controller subsystems 110 for controlling library functions (e.g., user interfaces, robot 140 operations, media drive 120 operations, maintenance and diagnostics functions, etc.). Embodiments can further include one or more power subsystems 440 that provide power to various components (e.g., the library controller subsystems 110, robot controller subsystems 430, media drives 120 etc.) via one or more busses, including rails 145. The rails 145 can further be used to carry communications, such as instructions communicated from the library controller subsystems 110 to direct operation of the robot controller subsystems 430. While FIG. 4 shows a single library controller subsystem 110 and a single robot controller subsystem 430 on a single set of rails 145, embodiments can operate in context of any suitable number of library controller subsystems 110, robot controller subsystems 430, and/or other systems (e.g., drive controllers, interface controllers, power controllers, etc.) in communication via any suitable number of rails 145. Further, while embodiments are described in context of communications from a library controller subsystems 110 to a robot controller subsystem 430, similar or identical functionality can be applied to any similar communications throughout the library such as from one or more robot controller subsystems 430a to one or more library controller subsystems 110, from one or more robot controller subsystems 430 to one or more other robot controller subsystems 430, from one or more library controller subsystems 110 to one or more other library controller subsystems 110, etc. (e.g., though other types of communications and/or power distribution may be implemented without rails 145, such as by cabling, or any other suitable mechanism).

Components of the media library system 400 can be implemented in any suitable manner. For example, each described function can be implemented using any suitable one or more components of the system, and specific associations of components with functions should not be construed as limiting the scope of potential implementations. Further, each function can be implemented in various hardware and/or software component(s) and/or module(s), including, but not limited to a circuit, an application specific integrated circuit (ASIC), or processor. The various illustrative logical blocks, modules, circuits, etc. described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As described above, the communications link between the robot 140 and the library controller subsystem 110 and power subsystem 440 can include a set of conductive rails 145 (e.g., a 48 VDC dual rail system, as shown in FIGS. 2 and 3). For example, one or more power supplies of the power subsystem 440 can power robot(s) 140 via power and ground conductors, which may be oppositely charged conductive layers of the rails 145; and the library controller subsystem 110 can generate instructions signals for distribution with the power signals over the rails 145 in any suitable manner.

Embodiments of the robot 140 can include power brushes 310 and signal brushes 320. As illustrated, the power brushes 310 can be coupled with a robot power circuit 420 of the robot 140, and the signal brushes 320 can be coupled with a robot signal circuit 425 of the robot 140. The robot power circuit 420 and the robot signal circuit 425 can be isolated circuits, each separately coupled with the robot controller subsystem 430. The robot power circuit 420 can include power components for receiving and processing the power signal received via the rails 145. For example, the robot power circuit 420 can include any suitable power conditioners, filters, step-up or step-down amplifiers, etc. These and/or other components can be used to adapt and deliver the power signal, as appropriate for electrical (and electromechanical) components of the robot 140 (e.g., and components of the robot support structure, robot-rail interface structure, etc.). The robot signal circuit 425 can include any suitable components for extracting the instruction signal from the power signal. For example, the robot signal circuit 425 can include filters, amplifiers, etc. In some implementations, the robot signal circuit 425 can include components for converting the received instruction signal into suitable commands for use by the robotic controller subsystem 430. Some embodiments of the robot signal circuit 425 can enable high-speed, full-duplex communications between the library controller subsystem(s) 110 and the robot controller subsystem(s) 430 (e.g., without relying on multiple conductors, cabling, wireless connections, etc.). For example, the robot signal circuit 425 can include any suitable components for converting the robot feedback and/or other information into a suitable instruction signal, and/or for modulating the instruction signal onto the power signal for communication over the conductive rail structure 145 via the signal brushes 320 to the library controller subsystem(s) 110 (and/or to other components of the storage library system).

In one embodiment, each robot 140 of the storage library system includes the robot controller subsystem 430, the set of signal brushes 320, the set of power brushes 310, the signal processing circuit 425, and the power processing circuit 420. In some embodiments, the power processing circuit 420 is electrically isolated from the signal processing circuit 425. As described above, the robot controller subsystem 430 directs movement of the robot system along a conductive rail structure 145 (e.g., a pair of conductive strips to carry an AC instruction signal modulated onto a DC power signal, along with suitable rail structure). The set of signal brushes 320 is adapted to maintain electrical signal contact between the robot system 140 and the conductive rail structure 145, and the set of power brushes 310 is adapted to maintain electrical power contact between the robot system 140 and the conductive rail structure 145. The signal processing circuit 425 has a set of signal brush inputs coupled with the set of signal brushes 320, and an instruction signal output coupled with the robot controller subsystem 430. The power processing circuit 420 has a set of power brush inputs coupled with the set of power brushes 310, and a power signal output coupled with the robot controller subsystem 430. The robot controller subsystem 430 is powered according to the power signal output and directs movement of the robot system 140 along the conductive rail structure 145 according to the instruction signal output. For example, the power brushes 310 and signal brushes 320 can be part of a robot-rail interface structure adapted to mechanically couple the robot system 140 to the conductive rail structure 145. As described herein, some embodiments include multiple robot systems 140, and some embodiments can include more than one robot system 140 sharing a common conductive rail structure 145 (e.g., moving along the same set of rails). The instruction signals can be used to coordinate movement of the multiple robots.

Figure 5:
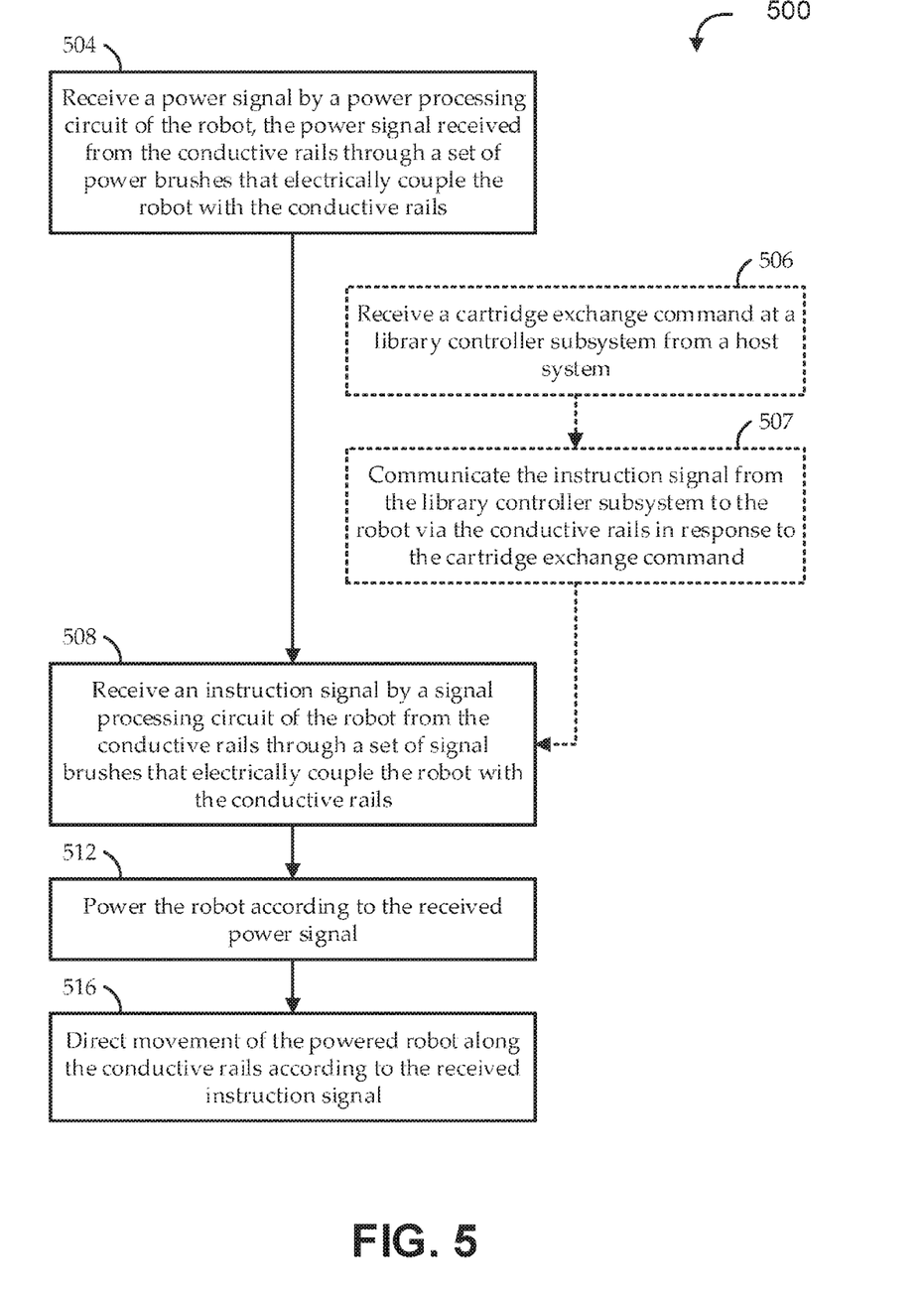
FIG. 5 shows a flow diagram of an illustrative method for communicating with a robot via conductive rails in a data storage library, according to various embodiments.

FIG. 5 shows a flow diagram of an illustrative method 500 for communicating with a robot via conductive rails in a data storage library, according to various embodiments. Embodiments of the method 500 can operate in context of any suitable media storage library system, such as the media library systems described with reference to FIGS. 1-4. Embodiments begin at stage 504 by receiving a power signal by a power processing circuit of the robot, the power signal received from the conductive rails through a set of power brushes that electrically couple the robot with the conductive rails. For example, each power brush can be made primarily of copper (e.g., from an alloy having approximately 75 percent copper).

At stage 508, an instruction signal can be received by a signal processing circuit of the robot. The instruction signal can be received from the conductive rails through a set of signal brushes that electrically couple the robot with the conductive rails. For example, each signal brush can be made primarily of silver. In some implementations, each signal brush is made of an alloy having at least 70 percent silver (e.g., 75 percent) and at least 20 percent graphite (e.g., 24 percent). In some embodiments, at stage 506, a cartridge exchange command is received at a library controller subsystem from a host system. At stage 507, the instruction signal is communicated from the library controller subsystem to the robot via the conductive rails in response to the cartridge exchange command. The communicated instruction signal is received at stage 508. In some implementations, an instruction signal can similarly be communicated from the robot to the library controller subsystem via the conductive rails (e.g., using full-duplex or other suitable communications).

Embodiments can receive the instruction signal via the conductive rails at higher than a threshold signal-to-noise ratio while the robot is moving along the conductive rails. For example, a minimum signal-to-noise ratio can be defined for reliable receipt and processing of the instruction signal, and the signal brushes can be designed to receive the instruction signal at a level higher than that threshold. As described above, prior approaches tended to be incapable of receiving instruction signals during robot movement. Embodiments of the method 500 can power the robot according to the received power signal at stage 512. At stage 516, embodiments can direct movement of the powered robot along the conductive rails according to the received instruction signal.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory. EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A robot system for ferrying media cartridges in a data storage library, the robot system comprising:
a robot controller subsystem that directs movement of the robot system along a conductive rail structure;

a set of signal brushes adapted to maintain electrical signal contact between the robot system and the conductive rail structure;

a set of power brushes adapted to maintain electrical power contact between the robot system and the conductive rail structure;

a signal processing circuit having a set of signal brush inputs coupled with the set of signal brushes, and an instruction signal output coupled with the robot controller subsystem; and a power processing circuit having a set of power brush inputs coupled with the set of power brushes, and a power signal output coupled with the robot controller subsystem, such that the robot controller subsystem is powered according to the power signal output and directs movement of the robot system along the conductive rail structure according to the instruction signal output.

2. The robot system of claim 1, wherein each signal brush is made primarily of silver.

3. The robot system of claim 1, wherein each signal brush is made of an alloy comprising at least 70 percent silver and at least 20 percent graphite.

4. The robot system of claim 1, wherein each power brush is made primarily of copper.

5. The robot system of claim 1, wherein the set of signal brushes is further adapted to receive instruction signals via the conductive rail structure, at higher than a threshold signal-to-noise ratio, during the movement of the robot system along the conductive rail structure.

6. The robot system of claim 1, wherein the power processing circuit is electrically isolated from the signal processing circuit.

7. The robot system of claim 1, further comprising:
a robot-rail interface structure adapted to mechanically couple the robot system to the conductive rail structure and to electrically couple the robot system to the conductive rail structure via the set of power brushes and the set of signal brushes.

8. A data storage library system comprising:
a conductive rail structure;
a robot adapted to ferry media cartridges, the robot comprising:
a signal processing circuit having a set of signal brush inputs and an instruction signal output; and
a power processing circuit having a set of power brush inputs and a power signal output; and
a robot-rail interface structure adapted to mechanically couple the robot to the conductive rail structure, the robot-rail interface structure comprising:
a set of signal brushes electrically coupled with the set of signal brush inputs and adapted to maintain electrical signal contact with the conductive rail structure; and
a set of power brushes electrically coupled with the set of power brush inputs and adapted to maintain electrical power contact with the conductive rail structure.

9. The data storage library system of claim 8, wherein the robot further comprises:
a robot controller subsystem coupled with and powered according to the power signal output, and coupled with and instructed according to the instruction signal output.

10. The data storage library system of claim 8, further comprising:

a library controller subsystem coupled with the conductive rail structure to communicate instruction signals with the robot via the conductive rail structure.

11. The data storage library system of claim 8, further comprising:
a power subsystem coupled with the conductive rail structure to communicate power signals to the robot via the conductive rail structure.

12. The data storage library system of claim 8, wherein the conductive rail structure comprises a pair of conductive strips to carry an AC instruction signal modulated onto a DC power signal.

13. The data storage library system of claim 8, further comprising:
a plurality of robot systems, each comprising a respective instance of the robot and a respective instance of the robot-rail interface structure,
wherein at least two of the robot systems are electrically coupled with a same set of rails of the conductive rail structure.

14. The data storage library system of claim 8, further comprising:
a plurality of media cells to hold a plurality of media cartridges; and
a plurality of media drives to read and/or write the media cartridges,
wherein the robot is adapted to ferry media cartridges along the conductive rail structure between at least a portion of the media cells and at least a portion of the media drives.

15. A method for communicating with a robot via conductive rails in a data storage library, the method comprising:
receiving a power signal by a power processing circuit of the robot, the power signal received from the conductive rails through a set of power brushes that electrically couple the robot with the conductive rails;
receiving an instruction signal by a signal processing circuit of the robot, the instruction signal received from the conductive rails through a set of signal brushes that electrically couple the robot with the conductive rails;
powering the robot according to the received power signal; and
directing movement of the powered robot along the conductive rails according to the received instruction signal.

16. The method of claim 15, wherein each signal brush is made primarily of silver.

17. The method of claim 15, wherein each power brush is made primarily of copper.

18. The method of claim 15, wherein the instruction signal is received via the conductive rails at higher than a threshold signal-to-noise ratio, while the robot is moving along the conductive rails.

19. The method of claim 15, further comprising:
receiving a cartridge exchange command at a library controller subsystem from a host system; and
communicating the instruction signal from the library controller subsystem to the robot via the conductive rails in response to the cartridge exchange command.

20. The method of claim 15, further comprising:
generating a feedback signal by the signal processing circuit of the robot;
communicating the feedback signal from the signal processing circuit of the robot to the library controller subsystem via the set of signal brushes and the conductive rails.

* * * * *